UNITED STATES PATENT OFFICE.

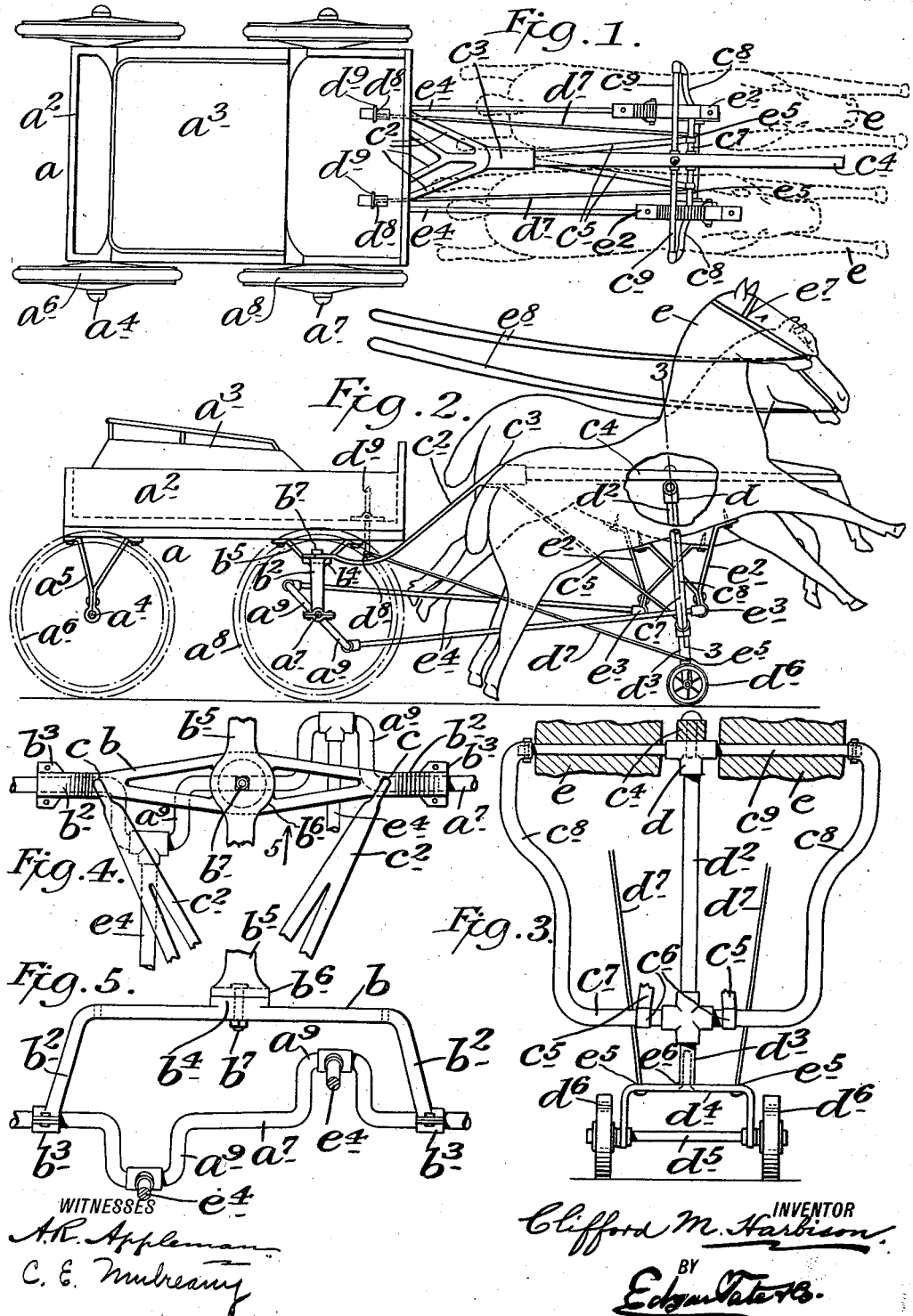

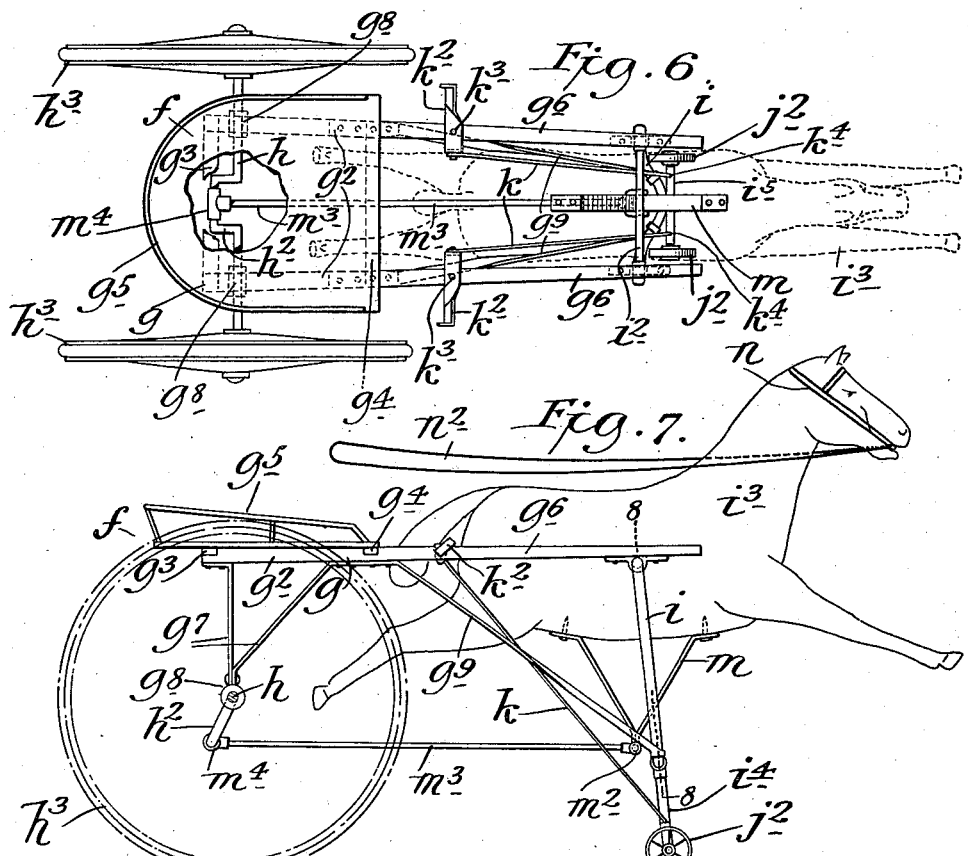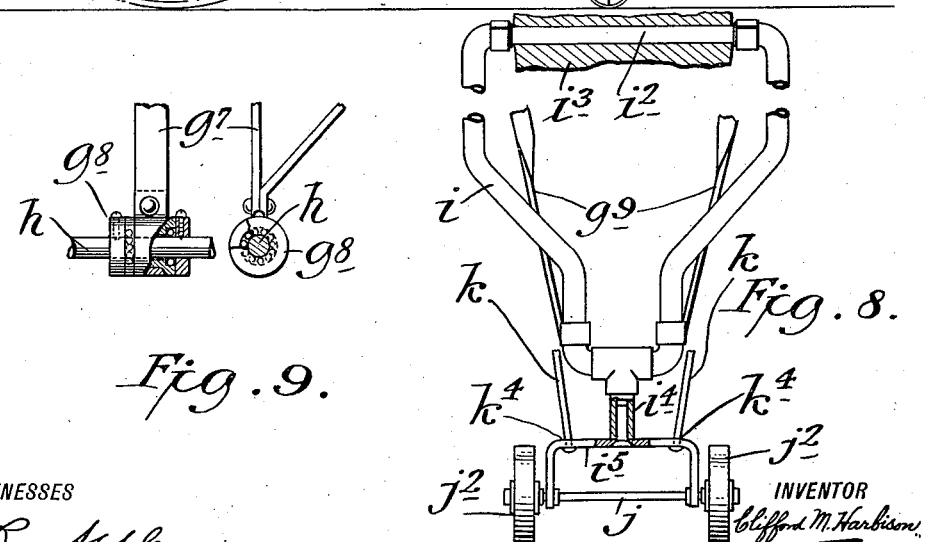

CLIFFORD M. HARBISON, OF BROOKLYN, NEW YORK, ASSIGNOR OF ONE-HALF TO AUGUST J. GLEISSNER, OF BROOKLYN, NEW YORK.

TOY WAGON.

1,028,875.  Specification of Letters Patent.  Patented June 11, 1912.

Application filed December 13, 1911. Serial No. 665,517.

*To all whom it may concern:*

Be it known that I, CLIFFORD M. HARBISON, a citizen of the United States, and residing at Brooklyn, in the county of Kings and State of New York, have invented certain new and useful Improvements in Toy Wagons, of which the following is a specification, such as will enable those skilled in the art to which it appertains to make and use the same.

This invention relates to toy wagons for children, and the object thereof is to provide a vehicle of this class having a figure or figures representing a horse or horses, or other animals pivotally supported and operating in the manner of levers in connection with a crank or crank shaft for propelling the vehicle, said figure or figures being operated by pulling on straps or reins connected with said figures in the manner of bridle straps or reins; a further object being to provide a vehicle of the class specified with improved steering or guiding mechanism, all of said parts being adapted to be operated by a child sitting on the seat of the vehicle.

The invention is fully disclosed in the following specification, of which the accompanying drawing forms a part, in which the separate parts of my improvement are designated by suitable reference characters in each of the views, and in which:—

Figure 1 is a plan view of a vehicle constructed according to my invention and involving two figures of horses; Fig. 2 a side view thereof with part of the construction broken away; Fig. 3 a partial section on the line 3—3 of Fig. 2; Fig. 4 a plan view of a part of the running gear of the vehicle and showing the front axle and its supports; Fig. 5 a view looking in the direction of the arrow 5 of Fig. 4, with parts omitted; Fig. 6 a view similar to Fig. 1, but showing a modification and with part of the construction broken away; Fig. 7 a side view of the device as shown in Fig. 6; Fig. 8 a partial section on the line 8—8 of Fig. 7, and; Fig. 9 a side and end view of the axle support shown in Figs. 6 and 7.

In the practice of my invention I provide a vehicle $a$ of the class specified and comprising a body $a^2$ having a seat $a^3$, a rear axle $a^4$ supported in hangers $a^5$ connected with the bottom of the body $a^2$ and having wheels $a^6$, and a front axle $a^7$ having wheels $a^8$.

The front axle $a^7$ is provided with two cranks $a^9$ and said axle is mounted in a transverse yoke-shaped support $b$ having downwardly directed side arms $b^2$ provided with axle bearings $b^3$, and said yoke-shaped support $b$ is provided centrally with a fifth-wheel construction $b^4$ involving a forwardly and backwardly ranging bracket $b^5$ secured to the bottom of the body $a^2$ centrally of the forward end thereof and having a central portion $b^6$ through which and the support $b$ is passed a pin $b^7$, all of this construction being clearly shown in Figs. 2, 4 and 5.

The central part of the yoke-shaped support $b$ is widened centrally and split longitudinally as shown in Fig. 4, and connected with the opposite end portions thereof at $c$ are two pole supports $c^2$ which extend upwardly and forwardly and which terminate in a pole socket $c^3$ in which is secured a pole $c^4$, and connected with the bottom of the pole socket $c^3$ and extending downwardly and forwardly are braces $c^5$ the lower ends of which are connected at $c^6$ with a yoke-shaped frame $c^7$ the side members $c^8$ of which extend upwardly and are connected by a transverse bar $c^9$ provided centrally with a three-way coupling $d$ to which the pole is secured and with which is connected a vertically arranged rod $d^2$ which is also connected with the bottom part of the frame $c^7$, and this construction forms a frame which is narrower at the bottom than at the top as shown in Figs. 1 and 3. The frame $c^7$ is also provided with a downwardly directed member $d^3$ with which is connected a transverse yoke-shaped support $d^4$ in which is mounted a steering or guiding axle $d^5$ provided with wheels $d^6$ and loosely connected with the support $d^4$ are guiding or steering rods $d^7$ which extend backwardly and upwardly to a point beneath the front end portion of the body $a^2$ of the vehicle where they are connected at $d^8$ with foot pedals $d^9$ which extend downwardly through the bottom of the body $a^2$.

On the opposite sides of the pole $c^4$ and on the top bar $c^9$ of the frame formed by the parts $c^7$, $c^3$, $c^9$, $d$ and $d^2$ are mounted figures $e$ representing horses, in the construction shown, and said horses are free to oscillate forwardly and backwardly on said frame, and secured to the bottom body portion of which is a downwardly directed V-shaped hanger $e^2$ with which is connected at $e^3$ a crank rod $e^4$, and these rods extend backwardly and are connected with the cranks $a^9$ of the front axle $a^7$ as clearly shown.

The connection of the rods $d^7$ with the yoke-shaped support $d^4$ at $e^5$ and the connection of said support $d^4$ at $e^6$ may be made in any desired manner, all that is necessary being that the connection at $e^6$ be a rotary connection, and that the connection at $e^5$ be so made as to permit the rods $d^7$ to turn the support $d^4$ in which the axle $d^5$ is mounted, so as to properly guide the vehicle.

In practice, the horses $e$ are provided with suitable head stalls or bridles $e^7$ having reins or lines $e^8$, and a child sitting on the seat $a^3$ by grasping said lines and pulling alternately thereon will give to the horses an oscillating forward and backward movement, and this movement will be transmitted to the axle $a^7$ and the vehicle will be propelled, as will be readily understood, and the operator may at the same time guide the vehicle by applying his feet to the pedals $b^9$.

In the construction shown in Figs. 6 to 9, inclusive, I substitute for the four-wheeled vehicle shown in Figs. 1 to 5, inclusive, a sulky vehicle $f$ comprising a frame $g$ composed of side members $g^2$, and a transverse rear member $g^3$ and a transverse front member $g^4$, and on which is secured a seat $g^5$. The sides $g^2$ of the frame $g$ are extended to form shafts $g^6$ and suspended from the frame $g$ or the opposite sides thereof are V-shaped hangers $g^7$ having bearings $g^8$ and in which is mounted an axle $h$ having a central crank $h^2$. I also provide a frame $i$ which takes the place of the frame on which the horses $e$ are mounted, in the construction shown in Figs. 1 to 5. The bottom part of the frame $i$ is narrower than the top part thereof and is provided with a transverse rod or bar $i^2$ on which is mounted a body $i^3$ which, in the form of construction shown, represents a horse, and the bottom of the frame $i$ is provided with a downwardly directed extension $i^4$ with which is rotatably connected a yoke-shaped frame $i^5$ in which is mounted an axle $j$ having wheels $j^2$ and connected with the frame $i^5$ are pedal rods $k$ which extend backwardly and upwardly and are connected with the inner ends of pedals $k^2$ pivoted to the shafts $g^6$ at $k^3$. The frame $i$ is also provided with braces $g^9$ which extend upwardly and backwardly and are secured to the frame $g$ and shafts $g^6$. The connection of the pedal rods $k$ with the frame $i^2$ at $k^4$ is a loose or pivotal connection and a child sitting in the seat $g^5$, by placing his feet on the pedals $k^2$ may steer or guide the vehicle, as will be readily understood. Secured to the bottom of the body of the horse $i^3$ is a V-shaped hanger $m$ with the bottom of which is connected, as shown at $m^2$, a crank rod $m^3$ which extends backwardly and is connected with the crank $h^2$ of the axle as shown at $m^4$. The axle $h$ is also provided with the usual wheels $h^3$ and, in practice, the horse $i^3$ is provided with a bridle $n$ having reins $n^2$, and a child sitting in the seat $g^5$ by alternately pulling on and releasing the pull on the reins $n^2$ may propel the vehicle, as will be readily understood, this operation serving to give the horse an oscillating forward and backward movement, which movement is transmitted to the axle $h$ by the crank rod $m^3$. The starting of the vehicle may be effected by means of the hands applied to the wheels $h^3$ and the operation of the horses as above described will continue the vehicle in motion.

In order that the operation of the vehicle may be accompanied by the least possible friction, I provide the axle $h$ with ball bearings at $g^8$ as clearly shown in Fig. 9, and these ball bearings may be of any preferred construction. With both forms of construction it will be seen that the horses $e$, or the bodies representing horses, in the forms shown, are centrally pivoted so that they are balanced or approximately so, and by reason of this construction as will be seen, the said bodies may be oscillated back and forth and the vehicle propelled with a minimum of effort, and on a down-grade the vehicle will propel itself and continue the motion of the horses.

My invention is not limited to the exact form, construction and arrangement of the various parts herein shown and described and various changes therein and modifications thereof may be made, within the scope of the appended claims, without departing from the spirit of my invention or sacrificing its advantages.

Having fully described my invention, what I claim as new and desire to secure by Letters Patent, is:—

1. A toy vehicle of the class described comprising a main part having a seat, hangers suspended thereunder, a crank axle mounted in said hangers, a transversely arranged upright body supporting frame mounted in front of the main part, a body pivotally supported on the top of the body supporting frame, a guiding axle supported at the bottom of the body supporting frame and adapted to swing in a horizontal plane and provided with wheels, a hanger connected centrally with said bottom of the body, a crank rod connected with said hanger and with the crank axle, and pedals supported in front of the seat and in operative connection with the guiding axle.

2. A vehicle of the class described comprising a main part provided with hangers having axles, the front axle being provided with cranks, an upright body supporting frame mounted in front of the main part and provided at the bottom thereof with a guiding axle adapted to swing in a horizontal plane and provided with wheels, pedals supported in the front of the main part and in operative connection with said guiding axle, bodies pivotally supported in the top of the body supporting frame, hangers connected with said bodies, crank rods connected with said hangers and with the cranks of the front axle, and a pole between said bodies and connected with the body supporting frame and with the hangers which support the front axle.

3. A vehicle of the class described comprising a main part provided with a rear axle having wheels, and a front axle having wheels and provided with two cranks, a transversely arranged body supporting frame mounted in front of the main part and provided at the bottom thereof with a guiding axle adapted to swing in a horizontal plane and provided with wheels, pedals supported in the front of the main part and in operative connection with the guiding axle bodies pivotally supported centrally thereof in the top of the body supporting frame, hangers connected with the central bottom part of said bodies, crank rods connected with said hangers and with the cranks of the front axle, and a pole supported between said bodies.

4. A vehicle of the class described comprising a main part provided with an axle, a transverse body supporting frame mounted at the front of the main part and provided at the bottom thereof with a guiding axle adapted to swing in a horizontal plane and provided with wheels, pedals supported in front of the main part and in operative connection with the guiding axle, a body pivotally supported centrally of the body supporting frame and in the top portion thereof, said bottom being provided centrally thereof with a hanger, and crank rod connected with said hanger and with the crank axle.

In testimony that I claim the foregoing as my invention I have signed my name in presence of the subscribing witnesses this 9th day of December 1911.

CLIFFORD M. HARBISON.

Witnesses:
C. E. MULREANY,
FRANK G. AT LEE.

Copies of this patent may be obtained for five cents each, by addressing the "Commissioner of Patents, Washington, D. C."